UNITED STATES PATENT OFFICE.

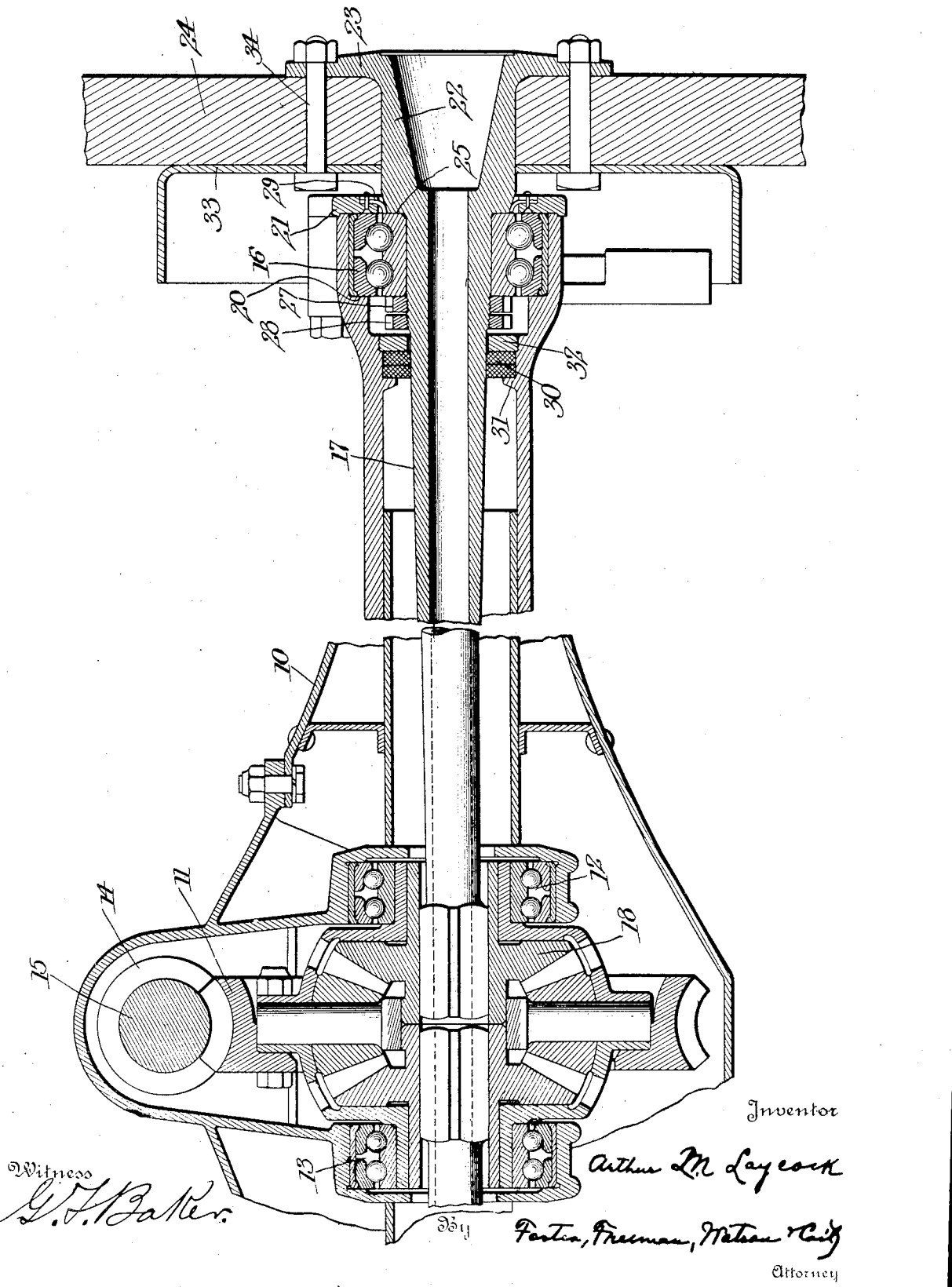

ARTHUR M. LAYCOCK, OF KINGSTON, PENNSYLVANIA.

AXLE CONSTRUCTION.

1,342,634. Specification of Letters Patent. Patented June 8, 1920.

Application filed December 21, 1916. Serial No. 138,227.

*To all whom it may concern:*

Be it known that I, ARTHUR M. LAYCOCK, formerly a subject of the King of Great Britain, but having taken out my first naturalization papers in the United States, residing at Kingston, Luzerne county, State of Pennsylvania, have invented certain new and useful Improvements in Axle Constructions, of which the following is a specification.

This invention relates to axle construction and more particularly to axles of the semi-floating type. The objects of the invention are to provide a substantial construction of this type which will be of extreme simplicity, durable, and which may be economically manufactured. Other objects and the features of novelty will be apparent from the following description taken in connection with the accompanying drawings, in which a longitudinal section through a part of an axle embodying my invention is shown.

The drawing consists of a longitudinal sectional view partly broken away of one embodiment of my invention.

Referring to the drawing, 10 indicates the axle tube or housing which carries at the middle thereof a driven differential gear 11, this gear being supported in the roller bearings 12 and 13. The gear 11 may be of any preferred type and is shown as a worm gear which is driven by a worm 14 on the shaft 15. The housing 10 is enlarged at its outer ends to receive ball bearings, one of which is shown at 16. A shaft 17 is supported in the bearing 16 and is operatively connected with the gear 18 of the differential by having its inner end squared, as shown at 19, or otherwise formed to provide a key connection with the gear 18. The bearing 16 is secured against axial movement in the housing 10 by a shoulder 20 and a removable retaining ring 21, the latter being secured to the end of the housing in any suitable manner as is well understood by those skilled in the art.

The shaft 17 is made from hollow tubing and has an enlarged outer end 22 which forms the wheel hub. This wheel hub portion has at its outer end a radial integral flange 23 which serves to fit against the outer sides of the spokes 24 of the wheel. The enlarged wheel hub portion at its inner end terminates in a shoulder 25 against which the ball bearing 16 may fit. Screw threaded rings, 27 and 28 may be placed on the shaft 17 on the inner side of the ball bearing 16 and a packing 29 may be placed in the retaining ring 21 to exclude dust from the bearing. A packing 30 may be placed around the shaft 17 and between it and the casing 10 and may be held in place by a shoulder 31 on the casing 10 and a screw threaded ring 32.

On the inner side of the spokes 24 a brake drum 33 may be placed fitting closely around the hub portion 22 of the shaft 17. Bolts 34 pass through the brake drum spokes and the flange 23 and secure the parts firmly together.

From the foregoing description it will be evident that the construction is very simple and that the shaft 17 and the wheel may be readily removed when desired by first removing the retaining ring 21 which will permit the shaft to be drawn out of the housing 10, the bearing 16 going with the shaft. The parts may be replaced in the same way. By making the shaft 17 of hollow tubing and providing the flange for the wheel hub at the outer end, the process of manufacture is made very simple and it is possible to make the device with a minimum amount of trouble and expense. Furthermore the flange being made at the outer end it is possible to make it much stronger and more lasting than would be the case if it were attempted to press up the flange from the body of the material between its ends. By this construction there are no sharp bends serving to weaken the device.

Having described the invention what is claimed is:

1. In axle construction, the combination of a tubular housing, a driven gear in said housing, a hollow shaft operatively connected with said gear and projecting from the end of said housing, said shaft having an integral flange at its outer end outside said housing, a bearing supporting the outer end of said shaft in the end of said housing and rigidly secured against axial movement relatively to the shaft, a retaining ring on the end of said housing for securing said bearing therein, wheel spokes on the projecting end of said shaft fitting against the inner side of said flange, and means for securing said wheel spokes to said flange.

2. In axle construction, the combination of a tubular housing having an interior shoulder near its outer end, a driven gear in said housing, a shaft operatively and longitudinally slidably connected with said gear and projecting from the end of said housing and adapted to be longitudinally withdrawn therefrom said shaft having an integral wheel hub outside said housing and including a radial flange at its end, an antifriction bearing including inner and outer raceways secured on and longitudinally movable with said shaft near its end and fitting within said housing at its end against said shoulder when the shaft is in operative position and releasable means for holding said shaft and housing against relative longitudinal movement.

3. In axle construction, the combination of a tubular housing, a driven gear in said housing, a shaft operatively connected with said gear and projecting from the end of said housing, an antifriction bearing secured on said shaft near its end fitting within the end of said housing, said shaft having an integral enlarged hub section outside said housing terminating in a radial flange, wheel spokes mounted on said hub against the inner face of said flange, and means for securing said spokes to the flange.

4. In axle construction, the combination of a tubular housing, a driven gear in said housing, a hollow shaft operatively connected with said gear and projecting from the end of said housing and longitudinally removable therefrom said shaft having an integral flange at its outer end outside said housing, a self contained bearing for said housing and shaft at the outer end, wheel spokes fitting against the inner side of said flange, a brake drum fitting against said spokes, and means for securing said drum spokes and flange together.

5. In an axle construction the combination of a tubular housing, a driven gear in said housing, a hollow longitudinally removable shaft extending within said housing and making at its inner end a sliding operative connection with said driven gear, said shaft having an integral enlarged hub section at its end outside of said housing and an integral radial flange at the outer end of said hub, a self contained antifriction bearing on said shaft held against the inner side of said hub and fitting within but longitudinally removable from the end of said housing and means for securing said bearing to said housing.

In testimony whereof I affix my signature.

ARTHUR M. LAYCOCK.